US005612106A

United States Patent [19]
Komiya et al.

[11] Patent Number: 5,612,106
[45] Date of Patent: *Mar. 18, 1997

[54] LAMINATED TUBE CONTAINER

[75] Inventors: Yuji Komiya, Tama; Hiroyuki Uchiumi, Tokyo; Shintaro Ohashi; Akio Kuboniwa, both of Yokohama, all of Japan

[73] Assignees: Toppan Printing Co, Ltd.; Lion Corporation, both of Tokyo, Japan

[*] Notice: The portion of the term of this patent subsequent to Aug. 3, 2010, has been disclaimed.

[21] Appl. No.: 442,559

[22] Filed: May 16, 1995

Related U.S. Application Data

[63] Continuation of Ser. No. 74,987, Jun. 10, 1993, abandoned, which is a continuation of Ser. No. 757,570, Sep. 11, 1991, Pat. No. 5,232,755.

[30] Foreign Application Priority Data

Sep. 14, 1990 [JP] Japan ................ 2-96583

[51] Int. Cl.⁶ .................. B32B 7/12; B32B 15/08; B32B 13/06; B32B 27/08
[52] U.S. Cl. .................. 428/36.91; 428/35.2; 428/347; 428/349; 428/353; 428/354; 428/446; 428/448; 428/451; 428/474.4; 428/475.5; 428/480; 428/500; 428/516
[58] Field of Search .................. 428/448, 446, 428/451, 35.2, 36.91, 347, 349, 353, 354, 474.4, 475.5, 480, 500, 516

[56] References Cited

U.S. PATENT DOCUMENTS

| | | |
|---|---|---|
| 3,442,686 | 5/1969 | Jones . |
| 4,478,874 | 10/1984 | Hahn . |
| 4,528,234 | 7/1985 | Kaiho et al. . |
| 4,552,791 | 11/1985 | Hahn . |
| 4,684,553 | 8/1987 | Sasaki et al. . |
| 4,702,963 | 10/1987 | Phillips et al. . |
| 4,778,697 | 10/1988 | Genske et al. . |
| 4,848,348 | 7/1989 | Craighead . |
| 5,075,143 | 12/1991 | Bekele . |
| 5,085,904 | 2/1992 | Deak et al. . |
| 5,100,720 | 3/1992 | Sawada et al. . |
| 5,232,755 | 8/1993 | Komiya et al. ........... 428/448 X |

FOREIGN PATENT DOCUMENTS

| | | |
|---|---|---|
| 0187512 | 3/1990 | European Pat. Off. . |
| 48-14663 | 5/1973 | Japan . |
| 51-48511 | 12/1976 | Japan . |
| 52-3418 | 1/1977 | Japan . |
| 52-24608 | 6/1977 | Japan . |
| 53-42310 | 10/1978 | Japan . |
| 53-12953 | 5/1987 | Japan . |
| 63-64638 | 4/1988 | Japan . |
| 1-62032 | 4/1989 | Japan . |
| 1-62033 | 4/1989 | Japan . |

OTHER PUBLICATIONS

*Abstract of JP 1202436*, Derwent Publications, Ltd., London, GB, Database WPIL, Accession No. 89–275786 (38), Aug. 15, 1989.
*Abstract of JP 49034984*, Derwent Publications, Ltd., London, GB, Database WPIL, Accession No. 74–81463V (47), Mar. 30, 1974.
*Abstract of JP 3061530*, Derwent Publications, Ltd., London, GB, Database WPIL, Accession No. 91–121873 (17), Mar. 18, 1991.

*Primary Examiner*—Terrel Morris
*Attorney, Agent, or Firm*—Staas & Halsey

[57] ABSTRACT

A laminated tube container has the body comprising a sheet material comprising a substrate, a silicon oxide deposited layer, a heat buffer layer and an extruded coating layer of a thermoadhesive resin which are successively formed in a laminate. The heat buffer layer prevents cracks from being produced in the silicon oxide deposited layer by the heat coming when the extruded coating layer of a thermoadhesive resin is laminated. The heat buffer layer is preferably formed by dry lamination or non-solvent lamination which requires no heating. An anchor coat layer may optionally be provided between the heat buffer layer and the extruded coating layer of a thermoadhesive resin so that the adhesion strength between these layers can be improved.

4 Claims, 1 Drawing Sheet

LAMINATED TUBE CONTAINER

This application is a continuation of application Ser. No. 08/074,987, filed Jun. 10, 1993, now abandoned which is a continuation of application Ser. No. 07/757,570, filed on Sep. 11, 1991, now U.S. Pat. No. 5,232,755, issued on Aug. 3, 1993.

BACKGROUND OF THE INVENTION

1. Field of the Invention

This invention relates to a laminated tube container used for packing therein toothpaste, food or the like. More particularly it relates to a laminated tube container comprising a silicon oxide deposited layer.

2. Description of the Related Art

Laminated tube containers used for packing therein toothpaste, food or the like which are conventionally in wide use are those in which a sheet material mainly comprised of a plastic film is used in the body. In particular, for the purpose of preventing the contents from their deterioration due to oxidation caused by oxygen coming from the outside of laminated tube containers, a material with excellent oxygen barrier properties, water-vapor barrier properties, etc. as exemplified by a metal foil such as aluminum foil and a plastic film with gas barrier properties such as polyvinylidene chloride film or ethylene-vinyl alcohol copolymer film is laminated together with a polyethylene layer, an ionomer resin layer or the like serving as a thermoadhesive resin layer (hereinafter often "sealing medium"). Of these materials, the aluminum foil is most widely used because of its very high gas barrier properties.

In the meantime, conventional laminated tube containers make use of aluminum foil as stated above and hence they are inevitably opaque. In recent years, however, there is an increasing demand for laminated tube containers which have high gas barrier properties and whose contents can be seen through. A transparent, laminated tube container that can answer such a demand is disclosed, for example, in Japanese Utility Model Application Laid-open No. 63-64638. The transparent, laminated tube container disclosed therein has the body comprised of a sheet material comprising a polyethylene terephthalate film and a deposited layer of a metal oxide such as silicon oxide, formed thereon as a gas barrier layer. Techniques by which such a deposited layer of silicon oxide or the like is formed as a gas barrier layer are known from relatively old times, and are reported in, for example, Japanese Patent Publications No. 51-48511 and No. 53-12953, and Japanese Utility Model Publications No. 52-3418 and No. 52-24608.

The silicon oxide deposited layer as disclosed in the Japanese Patent Publication No. 51-48511, Japanese Utility Model Publication No. 52-24608, etc., however, is so extremely thin a glassy layer that fine cracks tend to occur, which seriously tend to occur especially when heated. This is presumed to result from the phenomenon that the substrate on which the silicon oxide deposited layer is formed undergoes expansion and contraction by heat and the silicon oxide deposited layer can not follow this expansion and contraction. Occurrence of such cracks results in a serious lowering of the gas barrier properties of the laminated tube container.

An occasion on which such a thin silicon oxide deposited layer is heated can be met when a thermoadhesive resin layer is formed on the silicon oxide deposited layer in order for the laminated tube container to be endowed with thermal adhesion properties. As a function required in laminated tube containers, laminated tube containers must have the thermal adhesion properties so that the laminated tube containers can be readily worked when they are formed into tubes. In order for the laminated tube containers to be endowed with the thermal adhesion properties, the substrate for a laminated tube is laminated with a thermoadhesive resin film (a sealing medium) in usual instances. In such instances, the sealing medium usually gives a layer having the largest thickness in the sheet material for the laminated tube, and also gives a layer that imparts strength and flexibility to the laminated-tube sheet material and serves as a main component layer of the laminated-tube sheet material. A method for its lamination may include a method in which the substrate is laminated with a thermoadhesive resin film previously prepared, and a method in which a thermoadhesive resin is directly extruded in the form of a film onto the substrate to effect lamination to form the sealing medium, i.e., what is called the extrusion coating. In the method in which the substrate is laminated with the sealing medium, a substrate on which the silicon oxide deposited layer has been formed and the thermoadhesive resin film (sealing medium) previously prepared may be laminated using an adhesive, or the substrate and the sealing medium are laminated interposing between them a thermoadhesive resin coating formed by extrusion. The latter enables easy formation of the sealing medium in a large thickness, and is a preferred method.

Almost all of the laminated tubes making use of metal foil which are commercially available at present are comprised of a sealing medium formed by extrusion coating of the thermoadhesive resin onto the metal foil.

However, as previously stated, in the direct extrusion coating of the thermoadhesive resin onto the silicon oxide deposited layer, the substrate may undergo expansion and contraction in the manner as described above, to cause occurrence of fine cracks in the silicon oxide deposited layer. In addition, the occurrence of cracks may be promoted because the thermoadhesive resin layer formed by extrusion coating undergo constriction as the layer is cooled. As a result, the gas barrier properties of the laminated tube containers may be greatly lowered. This has been a problem unsolved.

SUMMARY OF THE INVENTION

An object of the present invention is to provide a laminated tube container that may cause no cracks to occur in the silicon oxide deposited layer even if it has the thermoadhesive resin layer laminated by extrusion coating, and has superior gas barrier properties.

Another object of the present invention is to provide a laminated tube container having superior gas barrier properties and also comprised of a superior thermoadhesive resin layer.

According to an embodiment, the present invention provides a laminated tube container having the body comprising a sheet material comprising a substrate, a silicon oxide deposited layer, a heat buffer layer and an extruded coating layer of a thermoadhesive resin which are successively formed in a laminate.

According to another embodiment, the present invention provides a laminated tube container having the body comprising a sheet material comprising a substrate, a silicon oxide deposited layer, a heat buffer layer, an anchor coat layer and an extruded coating layer of a thermoadhesive resin which are successively formed in a laminate.

DETAILED DESCRIPTION OF THE INVENTION

Figure 1:
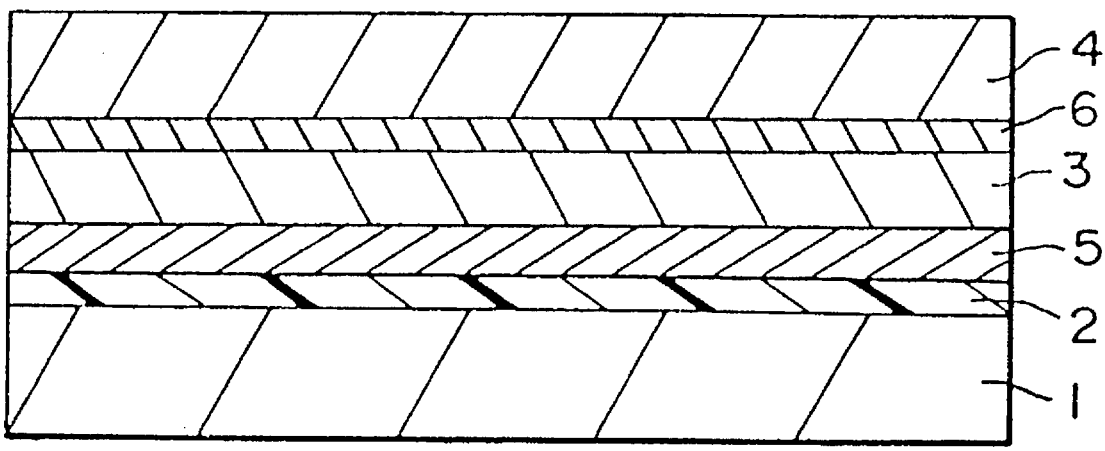
FIG. 1 is a cross section showing an example of the sheet material that constitute the body of the laminated tube container of the present invention.

In the laminated tube container of the present invention, the heat buffer layer obstructs the transfer of the heat coming from the extruded coating layer of a thermoadhesive resin provided thereon, prevents the expansion and contraction of the substrate on which the silicon oxide deposited layer is formed, and also absorbs the contraction ascribable to the extruded coating layer itself, so that no cracks are produced in the silicon oxide deposited layer. Thus, the laminated tube container of the present invention can have a crack-free silicon oxide deposited layer and hence can show good gas barrier properties. It can also prevent the packed contents from undergoing oxidation deterioration or the active components from permeating or escaping through the laminated tube. Moreover, the anchor coat layer optionally provided between the heat buffer layer and the thermoadhesive resin layer is effective for giving a superior peel strength.

The present invention will be described below with reference to the accompanying drawing. FIG. 1 cross-sectionally illustrates an example of the sheet material that constitute the body of the laminated tube container of the present invention. In FIG. 1, reference numeral 1 denotes a substrate; 2, a silicon oxide deposited layer; 3, a heat buffer layer; 4, an extruded coating layer; 5, an adhesive; and 6, an anchor coat layer.

As the substrate 1 used in the present invention, a filmlike or sheetlike plastic material on which the silicon oxide deposited layer 2 can be formed may preferably be used. Such a plastic material may include polyesters, stretched polypropylene, unstretched polypropylene, polyethylene, and stretched polyamides. Of these, polyesters, in particular, polyethylene terephthalate film can be most preferably used taking account of adhesion properties of the silicon oxide deposited layer 2, transparency, working properties, and cost.

The silicon oxide deposited layer 2 is provided by forming a film of a silicon oxide represented by the formula: $Si_xO_y$ (x=1 or 2; Y=1, 2 or 3), on the substrate 1 by a usual process such as vacuum deposition, ion plating, sputtering, or plasma deposition. The silicon oxide deposited layer 2 must be at least 800 Å thick in order to give the intended gas barrier properties. The layer may preferably be provided in a thickness of not less than 900 Å. In order to ensure the flexibility required as the laminated tube container, it may preferably be provided in a thickness of not more than 2,000 Å.

In the present invention, this silicon oxide deposited layer 2 is laminated thereon with a heat buffer layer 3.

This heat buffer layer 3 is a layer for preventing the substrate from its expansion and contraction due to the heat coming from the extruded coating layer 4 of the thermoadhesive resin described later. A plastic film made of a material having satisfactory heat buffer properties and formed in a sufficient thickness is used. Stated specifically, polyester films such as polyethylene terephthalate film, polyethylene films, polypropylene films, and polyamide films such as nylon film can be used. The film must be at least 10 µm in thickness, and should preferably be not less than 12 µm.

When the heat buffer layer 3 is provided on the silicon oxide deposited layer, it must be laminated in such a way that the substrate 1 may substantially undergo no expansion and constriction. In other words, when the heat buffer layer 3 is laminated, the expansion and contraction of the substrate must be controlled to such an extent that no cracks may be produced in the silicon oxide deposited layer 2. Hence, at the time of the lamination, it is necessary to control the conditions that may cause a great expansion and contraction of the substrate, e.g., to make control so as not to excessively increase the tension of the substrate 1 or not to be operated at high temperatures. From such viewpoints, although it may be possible to form the heat buffer layer 3 by extrusion coating or a process requiring heating as exemplified by heat lamination if heating temperatures are duly controlled, the heat buffer layer 3 should preferably be formed by a method making use of an adhesive, as exemplified by the dry lamination making use of a solvent type adhesive, or the non-solvent lamination making use of a non-solvent type adhesive.

The extruded coating layer 4 of a thermoadhesive resin is formed on this heat buffer layer 3. This coating layer usually acts as a bonding layer through which the laminate comprised of the substrate 1, the silicon oxide deposited layer 2 and the heat buffer layer 3 and the thermoadhesive resin film (sealing medium) are laminated. In some instances, this extruded coating layer 4 may be formed on the laminate comprised of the substrate 1, the silicon oxide deposited layer 2 and the heat buffer layer 3 so that the extruded coating layer 4 itself can serve as a sealing medium. The thermoadhesive resin used for such purpose may be appropriately selected from various thermoadhesive resins according to the properties required as laminated tube containers. Such a thermoadhesive resin may most commonly include polyethylene. In some instances, it is also possible to use ionomer resins for the purpose of imparting hot-sealing properties, or to use ethylene/vinyl acetate copolymer resins for the purpose of imparting thermal adhesion properties.

The extrusion coating of the thermoadhesive resin can be carried out by heating the thermoadhesive resin into a molten state, and extruding the molten resin from a T-die in the form of a film with a given thickness, to the interface between the members to be bonded, i.e., the interface between the sealing medium and the laminate comprised of the substrate 1, the silicon oxide deposited layer 2 and the heat buffer layer 3, followed by contact bonding and then cooling to effect lamination. In the instance where the extruded coating layer 4 itself is made to serve as a sealing medium as described above, the extrusion coating can be carried out by extruding the molten resin onto the members to be laminated, i.e., onto the laminate comprised of the substrate 1, the silicon oxide deposited layer 2 and the heat buffer layer 3, followed by contact bonding and then cooling to effect lamination.

The temperature conditions under which the thermoadhesive resin used in the extrusion coating is melted have a great influence on its adhesion properties. An excessively low resin temperature may bring about no sufficient adhesion strength (or peel strength) for the extruded coating layer 4 laminated. Thus the extrusion coating should preferably be carried out at a temperature of 300° C. or above in the case when the thermoadhesive resin comprises polyethylene, and 280° C. or above in the case when the thermoadhesive resin comprises an ionomer resin.

The extruded coating layer 4 may preferably be in a thickness of 50 µm at maximum in view of working efficiency. When it is desired to form a layer with a thickness larger than this, it is preferred that an additional film (the sealing medium or the like) is laminated using the extruded coating layer 4 as a bonding layer as described above or the extruded coating layer 4 is formed in two or more layers.

The sheet material that constitute the body of the laminated tube container of the present invention is comprised of at least the above substrate 1, silicon oxide deposited layer 2, heat buffer layer 3 and extruded coating layer 4 comprising the thermoadhesive resin. Other layer may also be laminated if necessary. For example, a conventional anchor coat layer may be provided between the heat buffer layer 3 and the extruded coating layer 4. The anchor coat layer thus provided can bring about an increase in adhesion strength (or peel strength) between the both layers. An ionomer resin layer may also be laminated to the extruded coating layer 4 for the purpose of imparting hot sealing properties, or an ethylene/vinyl acetate copolymer resin layer for the purpose of imparting low-temperature thermal adhesion properties.

All the materials used in the present invention may be made transparent to give a laminated tube container whose contents can be seen through. As will be obviously noted, a print layer may also be formed at a suitable position. It is also optional to laminate a layer of paper or non-woven fabric as a layer component so that "stiffness" can be imparted to the laminated tube container, or to color some of the layers by mixing therein a pigment or the like.

In the present invention, the heat buffer layer 3 is provided onto the silicon oxide deposited layer 2 so that the silicon oxide deposited layer 2 can be protected from the heat coming from the extruded coating layer 4 formed thereon. An additional extruded coating layer 4 may also be formed on the substrate on its side on which no silicon oxide deposited layer 2 is formed. Formation of such an additional layer is also effective for preventing cracks from being produced in the silicon oxide deposited layer 2. This is because the substrate 1 itself can function as the heat buffer layer and hence the expansion and contraction of the surface of the substrate 1 on its side on which the silicon oxide deposited layer 2 is formed can be made not so great as to produce no cracks in the silicon oxide deposited layer 2. Thus, the additional extruded coating layer provided on the back of the substrate 1 can bring about an improvement in mechanical properties of the laminated tube container.

Using the sheet material for laminated tube containers, thus obtained, the laminated tube container of the present invention can be produced in the same way as conventional sheet materials for laminated tube containers. More specifically, for example, first the sheet material for the laminated tube is cut to a given size, and the cut sheet material is wound around a cylindrical mandrel, followed by heat sealing to join its side portions so that it is formed into a cylinder whose both ends are open. Next, one of the above open ends is fusion-bonded at the same time when a mouth member is molded thereon by compression molding. Thereafter, a content as exemplified by toothpaste is packed from the other open end, and then the open end is sealed by heat sealing or ultrasonic sealing to complete the laminated tube container.

The present invention will be described below in greater detail by giving Examples.

EXAMPLE 1

On a substrate comprising a biaxially stretched polyethylene terephthalate film (trade name: P-11; available from Toray Industries, Inc; thickness: 12 μm), a silicon oxide deposited layer was formed by vacuum deposition in a thickness of 1,000 Å. On this silicon oxide deposited layer, a heat buffer layer comprising a biaxially stretched polyethylene terephthalate film (trade name: E-5200; available from Toyobo Co., Ltd.; thickness: 12 μm) was formed by dry lamination. Subsequently, on this heat buffer layer, a primer (a polyester anchoring agent) (trade name: AD-506S; available from Toyo Morton Co.) was coated to form an anchor coat layer, and thereafter a low-density polyethylene was extruded from a T-die and laminated to the anchor coat layer in a thickness of 45 μm (processing speed: 40 m/min).

Oxygen permeability of the resulting laminate was measured by the MOCON method using OX-TRAN 10/50A (trade name; produced by Modern Controls, Inc.) as an oxygen permeability measuring apparatus. The results of the measurement are shown in Table-1. Adhesion strength (peel strength) of the laminate was also measured using Strograph R (trade name: produced by Toyo Seiki Seisaku-Sho, Ltd.) under conditions of 25° C and 100% RH. Average values of the measurement results are shown in Table 2. The peel strength was tested by a method in which a striplike laminate of 15 mm in width is used as a test piece to measure the load necessary for separating the heat buffer layer end the thermoadhesive resin layer in T-peel or in the direction of 180° at a rate of 100 mm/min.

EXAMPLE 2

A laminate was obtained in the same procedure as in Example 1 except that an ethylene/ethyl acrylate copolymer (ethyl acrylate content: 6% by weight) was used as the thermoadhesive resin and no anchor coat layer was formed.

Oxygen permeability and peel strength were also measure on the resulting laminate in the same manner as in Example 1 to obtain the results as shown in Table 1 and Table 2, respectively.

In Table 1, results on the oxygen permeability of a control are also shown, which is a laminate comprised of a substrate and a silicon oxide deposited layer formed thereon but no thermoadhesive resin layer formed thereafter (i.e., a laminate in which the silicon oxide deposited layer is not heated and therefore the initial gas barrier properties is retained).

TABLE 1

| Example | Processing temperature | Oxygen permeability* $(cc/m^2 \cdot day \cdot atm)$ | | | |
|---------|------------------------|---|---|---|---|
| Control | No thermoadhesive resin layer | 1.1 | 1.0 | 1.3 | 1.1 |
| 1 | 320° C. | 1.1 | 0.9 | — | — |
| 2 | 280° C. | 1.3 | 1.1 | — | — |

*In control, results on four samples; in Examples 1 and 2, results on two samples.

TABLE 2

| | Peel strength (g/15 mm width) | | | |
|---|---|---|---|---|
| | T-peel | | 180°-peel | |
| Example | After 3 days | After 14 days | After 3 days | After 14 days |
| 1 | >1,000 | >1,000 | >1,000 | >1,000 |
| 2 | 260 | 380 | 370 | 550 |

As is clear from the results shown in Tables 1 and 2, there is no decrease in the gas barrier properties, in other words, no cracks are produced in the silicon oxide deposited layer even at a processing temperature higher than 250° C., when the heat buffer layer is provided on the silicon oxide deposited layer as in the present invention and then the thermoadhesive resin is extrusion-coated thereon. In particular, as is also seen from the results, a satisfactory peel strength and a practically useful laminated tube container can be obtained when the anchor coat layer is provided.

Comparative Examples 1 to 11

On a substrate comprising a biaxially stretched polyethylene terephthalate film (trade name: P-11; available from Toray Industries, Inc; thickness: 12 μm), a silicon oxide deposited layer was formed by vacuum deposition in a thickness of 1,000 Å. (In respect of Comparative Example 7, the silicon oxide deposited layer was formed after the same anchor coat layer as in Example 1 had been formed.) To this silicon oxide deposited layer, the following thermoadhesive resins were each extruded from a T-die and directly laminated in a thickness of 45 μm (processing speed: 40 m/min). Oxygen permeability of the resulting laminates each was measured in the same manner as in Example 1. Results obtained are shown in Table 3. Peel strength between the silicon oxide deposited layer and thermoadhesive resin layer of the laminate was also measured in the same manner as in Example 1. Average values of the results on the measurement carried out three times are shown in Table 4.

Thermoadhesive Resins Used

Comparative Examples 1 to 3

Ethylene/methacrylic acid copolymer resin (methacrylic acid content: 11% by weight)

Comparative Example 4

Ionomer resin (metal component: zinc)

Comparative Examples 5 to 6

Ethylene/methacrylic acid copolymer resin (methacrylic acid content: 6% by weight)

Comparative Example 7

Low-density polyethylene

Comparative Examples 8 to 11

Low-density polyethylene

Remarks: The low-density polyethylenes used in Comparative Example 7 and Comparative Examples 8 to 11, respectively, have different resin grades.

TABLE 3

| Comparative example | Processing temperature | Oxygen permeability* (cc/m² · day · atm) | | | |
| --- | --- | --- | --- | --- | --- |
| 1 | 290° C. | 17 | 16 | — | — |
| 2 | 250° C. | 0.8 | — | — | — |
| 3 | 230° C. | 0.6 | — | — | — |
| 4 | 300° C. | 18 | 15 | — | — |
| 5 | 250° C. | 2.4 | — | — | — |
| 6 | 230° C. | 0.8 | 0.9 | 1.0 | 0.9 |
| 7 | 320° C. | 26 | 29 | — | — |
| 8 | 290° C. | 26 | — | — | — |
| 9 | 270° C. | 18 | — | — | — |
| 10 | 250° C. | 1.1 | — | — | — |
| 11 | 230° C. | 0.6 | — | — | — |

*In Comparative Examples 1, 4 and 7, results on two samples; in Comparative Example 6, four samples; and in others, one sample.

TABLE 4

| Comp- arative example | Peel strength (g/15 mm width) | | | |
| --- | --- | --- | --- | --- |
| | T-peel | | 180°-peel | |
| | After 3 days | After 14 days | After 3 days | After 14 days |
| 1 | 190 | >1,000 | — | 620 |
| 2 | 100 | — | 170 | — |
| 3 | 70 | — | 120 | — |
| 4 | 170 | 210 | — | >1,000 |
| 5 | 100 | 100 | — | 180 |
| 6 | 140 | — | 200 | — |
| 7 | 350 | 300 | — | 550 |
| 8 | >1,000 | — | >1,000 | — |
| 9 | 160 | — | 230 | — |
| 10 | 10 | — | 30 | — |
| 11 | 10 | — | 10 | — |

As is clear from the results shown in Tables 3 and 4, there is a decrease in the gas barrier properties, in other words, cracks are produced in the silicon oxide deposited layer at a processing temperature higher than 250° C. in the extrusion coating. No satisfactory peel strength nor practically useful laminated tube container receptacle can be obtained at a processing temperature not higher than 250° C. which is the temperature at which no cracks are produced in the silicon oxide deposited layer.

Example 3 & Comparative Example 12

Tube containers of the present invention and of a comparative example were prepared using laminated-tube sheet materials each having the following layer constitution and using polyethylene as a shoulder material. As a content, toothpaste was packed in each of them, which was then stored for 30 days under conditions of a temperature of 50° C., 40° C. or 20° C. to measure the rate of weight loss of the contents. Results obtained are shown in Table 5.

Layer constitution—(Numerals given at the lower part indicate thickness, μm)

EXAMPLE 3

PE/Anchor coat/PET/SiO-VM/Dry-laminate adhesive/PET/
140          12                                              12
Anchor coat/PE
                100

Comparative Example 12

PE/Anchor coat/PET/SiO-VM/Anchor coat/PE
140          12                          100

PE: Polyethylene

PET: Polyethylene terephthalate film

SiO-VM: Silicon oxide deposited layer

TABLE 5

| | Storage temperature | Rate of weight loss (%) |
| --- | --- | --- |
| Example 3 | 50° C. | 0.64 |
| | 40° C. | 0.45 |
| | 20° C. | 0.08 |

TABLE 5-continued

| | Storage temperature | Rate of weight loss (%) |
|---|---|---|
| Comparative | 50° C. | 1.30 |
| Example 12 | 40° C. | 0.67 |
| | 20° C. | 0.11 |

As is seen from the results shown in Table 5, the container with the layer constitution of the present invention causes no cracks in the barrier layer, silicon oxide deposited layer and hence it allows no permeation of the water content of the toothpaste. The weight loss in Example 3 is due to the permeation at the shoulder part.

As having been described above, the laminated tube container of the present invention, having the above layer constitution, causes no cracks in the silicon oxide deposited layer and hence has satisfactory gas barrier properties, thus making it possible to protect the contents. In addition, since the laminated tube container to be obtained can also be made transparent, the contents can be seen through, and also an opaque portion can also be partially formed with ease by providing a print layer. Thus the present invention can be used over a very wide range, compared with conventional opaque laminated tube containers.

What is claimed is:

1. A laminated tube container comprising a sheet material comprising a substrate of a plastic material, a deposited silicon oxide layer, an adhesive layer, a heat buffer layer, an anchor coat layer and a first extruded coating layer of a thermoadhesive resin which are successively laminated, said deposited silicon oxide layer being crack-free and having a thickness of at least 800 Å, said heat buffer layer being selected from the group consisting of a polyester film, a polyethylene film, a polypropylene film and a polyamide film, said anchor coat layer being a polyester anchoring agent.

2. The laminated tube container according to claim 1, wherein said substrate is selected from the group consisting of polyester, polypropylene, polyethylene, and stretched polyamide.

3. The laminated tube container according to claim 1, wherein a thermoadhesive resin layer is further formed on the first extruded coating layer.

4. A laminated tube container, comprising:

a substrate of a plastic material, a deposited silicon oxide layer, an adhesive layer, a heat buffer layer, an anchor coat layer and a first extruded coating layer of a thermoadhesive resin which are successively laminated, said deposited silicon oxide layer being crack-free and having a thickness of at least 800 Å, said heat buffer layer being selected from the group consisting of a polyester film, a polyethylene film, a polypropylene film and a polyamide film, said anchor coat layer being a polyester anchoring agent, wherein said substrate includes a first side and a second side, said deposited silicon oxide layer being deposited on said first side, and a second extruded coating layer of a thermoadhesive resin being formed on said second side.

* * * * *